(12) United States Patent
Sun et al.

(10) Patent No.: US 10,738,790 B2
(45) Date of Patent: Aug. 11, 2020

(54) FAN DEVICE, AIR FLOW ADJUSTMENT DEVICE AND AIR VOLUME CONTROL METHOD THEREOF

(71) Applicant: Johnson Electric S.A., Murten (CH)

(72) Inventors: Chiping Sun, Hong Kong (CN); Shinghin Yeung, Hong Kong (CN); Haibo Jiang, Shen Zhen (CN); Yunlong Jiang, Shen Zhen (CN); Guodong Liu, Shen Zhen (CN); Zhiwang Chen, Shen Zhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 168 days.

(21) Appl. No.: 15/876,446

(22) Filed: Jan. 22, 2018

(65) Prior Publication Data
US 2018/0209433 A1 Jul. 26, 2018

(30) Foreign Application Priority Data

Jan. 20, 2017 (CN) .......................... 2017 1 0042503

(51) Int. Cl.
*G05B 6/02* (2006.01)
*F04D 27/00* (2006.01)
*F04D 25/06* (2006.01)

(52) U.S. Cl.
CPC .......... *F04D 27/004* (2013.01); *F04D 25/06* (2013.01); *G05B 6/02* (2013.01)

(58) Field of Classification Search
None
See application file for complete search history.

(56) References Cited

U.S. PATENT DOCUMENTS

| 5,559,407 A * | 9/1996 | Dudley | F04D 27/004 318/400.08 |
| 6,504,338 B1 * | 1/2003 | Eichorn | G05D 7/0676 236/DIG. 9 |

(Continued)

FOREIGN PATENT DOCUMENTS

CN 102315809 A 1/2012

OTHER PUBLICATIONS

Canadian Intellectual Property Office, Office Action, dated Mar. 5, 2019, 4 pages.

*Primary Examiner* — Thomas C Lee
*Assistant Examiner* — Gary Collins
(74) *Attorney, Agent, or Firm* — Muncy, Geissler, Olds & Lowe, P.C.

(57) ABSTRACT

A motor-driven fan device includes a motor, a processor, a storage with a lookup table stored therein, and a speed detection unit. The processor queries the lookup table or calculates to acquire the target driving voltage and a corresponding target rotating speed of the motor. When the rotating speed difference is not within the range of the preset rotating speed difference, the processor repeatedly adds a gain value to the target driving voltage to acquire a new target driving voltage, acquires the actual rotating speed and the target rotating speed, and determines whether the rotating speed difference is within the range of the preset rotating speed difference. The processor maintains the operation of the motor at the target rotating speed at that point by using the constant speed control method when the absolute value of rotating speed difference is within the range of the preset rotating speed difference.

20 Claims, 8 Drawing Sheets

(56) References Cited

U.S. PATENT DOCUMENTS

| | | | |
|---|---|---|---|
| 7,244,106 B2 | 7/2007 | Kallman et al. | |
| 2008/0188173 A1* | 8/2008 | Chen | F24F 11/77 |
| | | | 454/239 |
| 2010/0256821 A1* | 10/2010 | Jeung | G05B 15/02 |
| | | | 700/276 |
| 2012/0009863 A1* | 1/2012 | Sun | H02P 6/06 |
| | | | 454/228 |
| 2015/0064023 A1* | 3/2015 | Sasaki | H02P 6/06 |
| | | | 417/43 |
| 2017/0146256 A1* | 5/2017 | Alexander | F24F 13/1426 |

* cited by examiner

FAN DEVICE, AIR FLOW ADJUSTMENT DEVICE AND AIR VOLUME CONTROL METHOD THEREOF

CROSS REFERENCE TO RELATED APPLICATIONS

This non-provisional patent application claims priority under 35 U.S.C. § 119(a) from Patent Application No. 201710042503.9 filed in The People's Republic of China on Jan. 20, 2017.

FIELD OF THE INVENTION

The present invention relates to the field of motors, and in particular to a motor-driven fan device.

BACKGROUND OF THE INVENTION

Ventilation systems and air conditioning systems commonly use a fan comprising a fan blade or impeller driven by an electric motor to create the air flow and adjust the air flow by changing the speed of the motor. When the static pressure of the system varies, which may be caused by changes in the ductwork of the system, in exterior wind pressure or the like, the volume of air moved by the system also varies. Such as the static pressure in the system increases because dust is trapped in an internal device of the system, in particular, oil stain is attached to a filter screen of a range hood after operation for a long time, the air volume is decreased, thereby resulting in polluting indoor air. The increasing of carbon monoxide which will endanger the health of users in kitchens. Therefore, for certain installations it is desired to keep the volume of air flowing through the system constant, regardless of static pressure variations.

The present invention aims to provide a new method to keep the volume of the air flow constant.

SUMMARY OF THE INVENTION

Accordingly, in one aspect thereof, an embodiment of the present invention provides a method for controlling the air volume of an air flow adjustment device which is driven by a motor, the method comprising:

a: querying a lookup table according to a preset air volume $Qu$ to acquire two stored operating points which have air volume values closest to the preset air volume $Qu$ when the static pressure $P$ is equal to zero, calculating a driving voltage and a rotating speed at the operating point $Tar0$ of the motor associated with the preset air volume $Qu$ based on known driving voltages and known rotating speeds of the motor contained in the two operating points, and the acquired driving voltage and rotating speed being taken as a target driving voltage $TV$ and a corresponding target rotating speed $TN$; wherein the lookup table stores parameter values of all operating points where a plurality of fan characteristic curves intersect with a plurality of system impedance curves;

b: driving the motor with the target driving voltage $TV$;

c: detecting an actual rotating speed $N$ of the motor under the target driving voltage $TV$;

d: determining whether an absolute value of a rotating speed difference $\Delta N=|N-TN|$ between the actual rotating speed $N$ and the target rotating speed $TN$ of the motor is within the range of a preset rotating speed difference;

e: maintaining operation of the motor with the target rotating speed $TN$ by using a constant speed control method when the absolute value of the rotating speed difference $\Delta N$ is within the preset rotating speed difference;

f: adding a gain value $Vz$ to the target driving voltage to acquire a new target driving voltage $TV=TV+Vz$ when the absolute value of rotating speed difference $\Delta N$ is not within the range of the preset rotating speed difference; and acquiring the target rotating speed $TN$ corresponding to the new target driving voltage $TV$ by querying the lookup table or calculating based on the stored data in the lookup table; and returning to execute step b.

Preferably, parameter values of all operating points where the line on which the preset air volume $Qu$ is located intersects with the fan characteristic curves, the parameter values at least comprise the air volume, the driving voltage and the rotating speed of the motor.

Preferably, when the static pressure $P$ is equal to zero, the driving voltage and the rotating speed at the operating point $Tar0$ of the motor associated with the preset air volume $Qu$ are acquired through the following steps:

searching for two operating points $Pa$ and $Pb$, where the air volume is the closest to the preset air volume $Qu$, from the stored operating points where the static pressure is equal to zero, wherein the known air volume, the known driving voltage and the known rotating speed of the motor corresponding to the operating point $Pa$ are denoted as $Qa$, $Va$, $Na$, and the known air volume, the known driving voltage and the known rotating speed of the motor corresponding to the operating point $Pb$ are denoted as $Qb$, $Vb$, $Nb$;

acquiring a driving voltage $TV$ of the motor when the static pressure $P$ is equal to zero and the preset air volume is $Qu$ according to a two-point equation $(Qa-Qu)/(Va-TV)=(Qu-Qb)/(TV-Vb)$; and acquiring a target rotating speed $TN$ of the motor when the static pressure $P$ is equal to zero and the preset air volume is $Qu$ according to a two-point equation $(Qa-Qu)/(Na-TN)=(Qu-Qb)/(TN-Nb)$.

Preferably, the parameter values of the rotating speeds at the operating points, where the line on which the preset air volume $Qu$ is located intersects with each of the fan characteristic curves, are acquired through the following steps:

searching for two operating points $Pc$ and $Pd$ where the air volume is the closest to the preset air volume $Qu$ from the stored operating points on each of the fan characteristic curves i; wherein the air volume, the driving voltage and the rotating speed of the motor corresponding to the operating point $Pc$ are denoted as $Qc$, $Vc$, $Nc$; wherein the air volume, the driving voltage and the rotating speed of the motor corresponding to the operating point $Pd$ are denoted as $Qd$, $Vd$, and $Nd$; and acquiring the rotating speed $TNi$ of the operating point, where the line on which the preset air volume $Qu$ is located intersects with the fan characteristic curve i, according to the two-point equation $(Qc-TQi)/(Nc-TNi)=(TQi-Qd)/(TNi-Nd)$ and $TQi=Qu$.

Preferably, the step (f) further comprises:

searching for two operating points $TARa$ and $TARb$, where the driving voltages are the closest to a new target driving voltage $TV$, from the stored operating points where the line on which the preset air volume $Qu$ is located intersects with the fan characteristic curve, according to the new target driving voltage $TV$, wherein the known air volume, the known driving voltage and the known rotating speed of the motor corresponding to the operating point $TARa$ are denoted as $TQa$, $TVa$ and $TNa$, and wherein the known air volume, the known driving voltage and the known rotating speed of the motor corresponding to the operating point $TARb$ are denoted as $TQb$, $TVb$ and $TNb$; and acquiring the target rotating speed TN according to the two-point equation $(TVa-TV)/(TV-TVb)=(TNa-TN)/(TN-TNb)$.

Preferably, the gain value Vz is a fine-tuning value greater than zero.

Preferably, the gain value Vz is a group of various values which comprises positive numbers and/or negative numbers, when the absolute value of rotating speed difference ΔN is not within the range of the preset rotating speed difference, choose one of the values to acquire a new target driving voltage according the rotating speed difference between the actual rotating speed N and the target rotating speed TN of the motor.

Preferably, the air volume control method further comprises periodic automatic adjustment steps of:

detecting an actual current driving voltage TVx and an actual current rotating speed N of the motor when the adjustment cycle of the air volume is expired;

determining a corresponding rotating speed TNx at an operating point, where the fan characteristic curve on which the actual driving voltage is located intersects with the line on which the preset air volume Qu is located, by using the known driving voltage and the known rotating speed data of the motor in the lookup table, according to the actual driving voltage TVx;

determining whether an absolute value of a rotating speed difference between the actual rotating speed N and the corresponding rotating speed TNx of the motor is within a range of a preset rotating speed difference; maintaining operation of the motor with the actual rotating speed N by using the constant speed control method when the absolute value of the rotating speed difference is within the preset rotating speed difference; and returning to execute steps a-f when the absolute value of rotating speed difference is not within the range of the preset rotating speed difference.

Preferably, the corresponding rotating speed TNx at the operating point, where the fan characteristic curve on which the actual driving voltage TVx is located intersects with the line Z1 on which the preset air volume Qu is located, is acquired by querying the lookup table when the fan characteristic curve on which the actual driving voltage TVx is located coincides with a fan characteristic curve already stored in the lookup table.

Two operating points TARc and TARd, where the driving voltages are the closest to the actual driving voltage TVx, are searched from the stored operating points where the line on which the preset air volume Qu is located intersects with the fan characteristic curve, according to the actual driving voltage TVx, when the fan characteristic curve on which the actual driving voltage TVx is located does not coincide with the fan characteristic curve already stored in the lookup table, and the known air volume, the known driving voltage and the known rotating speed of the motor corresponding to the operating point TARc are denoted as TQc, TVc and TNc, and wherein the known air volume, the known driving voltage and the known rotating speed of the motor corresponding to the operating point TARd are denoted as TQd, TVd and TNd; the corresponding rotating speed TNx are acquired according to the two-point equation $(TVc-TVx)/(TVx-TVd)=(TNc-TNx)/(TNx-TNd)$.

Preferably, the target driving voltage of the motor is controlled by controlling a duty cycle of a PWM signal provided to the motor.

Preferably, the actual rotating speed N is acquired by calculating a Hall signal detected by a Hall sensor of the motor.

In another aspect, an embodiment of the present invention provides a system for controlling the air volume of an air flow adjustment device. The system comprises:

a querying unit for querying the lookup table or calculating based on stored data in the lookup table according to the preset air volume Qu to acquire a target driving voltage TV and a corresponding target rotating speed TN of the motor associated with a preset air volume Qu when the static pressure P is equal to zero, wherein the lookup table stores parameter values of all operating points where a plurality of fan characteristic curves intersect with a plurality of system impedance curves, and parameters of all operating points where the line on which the preset air volume Qu is located intersects with the fan characteristic curves, the parameter values at least comprise the air volume, the driving voltage and the rotating speed of the motor;

a driving unit for driving the motor with the target driving voltage TV;

a speed detection unit for detecting an actual rotating speed N of the motor under the target driving voltage TV;

a determining unit for determining whether an absolute value of a rotating speed difference $\Delta N=|N-TN|$ between the actual rotating speed N and the target rotating speed TN of the motor is within a range of a preset rotating speed difference, wherein operation of the motor is maintained at the target rotating speed TN at that point by using a closed loop speed control method when the absolute value of the preset rotating speed difference ΔN is within the range of the predetermined rotating speed difference; and an adjustment unit for adding a gain value Vz to the target driving voltage to acquire a new target driving voltage TV=TV+Vz when the absolute value of rotating speed difference ΔN is not within the range of the preset rotating speed difference, and acquiring the target rotating speed TN corresponding to the new target driving voltage TV by querying the lookup table or calculating based on the stored data in the lookup table, wherein the driving unit operates after the target rotating speed TN is acquired.

In still another aspect, an embodiment of the present invention provides a motor-driven fan device comprising:

a motor;

a processor for driving the motor;

a storage for storing a lookup table, wherein the lookup table stores parameter values of all operating points where a plurality of fan characteristic curves intersect with a plurality of system impedance curves;

a sensor for detecting a rotating speed of the motor, wherein the processor queries the lookup table or calculates based on the stored data in the lookup table according to the preset air volume Qu to acquire the target driving voltage TV and a corresponding target rotating speed TN of the motor associated with the preset air volume Qu when the static pressure P is equal to zero, the processor drives the motor with the target driving voltage TV, the processor determines whether an absolute value of a rotating speed difference $\Delta N=|N-TN|$ between the actual rotating speed N and the target rotating speed TN of the motor, acquired by the sensor, is within a range of a preset rotating speed difference, the processor maintains the operation of the motor at the target rotating speed TN at that point by using a closed-loop speed control method when the rotating speed difference ΔN is within the range of the preset rotating speed difference, and the processor repeatedly adds a gain value Vz to the target driving voltage to acquire a new target driving voltage TV=TV+Vz when the absolute value of rotating speed difference ΔN is not within the range of the preset rotating speed difference, and then drives the motor to operate with a new target driving voltage TV and acquires the actual rotating speed N, acquires the target rotating speed TN corresponding to the new target driving voltage TV by querying the lookup table or calculating based on the stored data in the lookup table, and determines whether the absolute value of the rotating speed difference is within the range of the preset rotating speed difference, and the processor maintains the operation of the motor at the target rotating speed TN at that point by using the constant speed control method when the absolute value of rotating speed difference ΔN is within the range of the preset rotating speed difference.

Preferably, parameters of all operating points where the line on which the preset air volume Qu is located intersects with the fan characteristic curves, the parameter values at least comprise the air volume, a driving voltage and a rotating speed of the motor.

Preferably, the constant speed control method is a PID, PI or PD closed-loop feedback control method.

An embodiment of the present invention also provides an air flow adjustment device comprising the motor-driven fan device as described above.

According to the embodiments of the present invention, the air flow adjustment device is enabled to still output constant air volume even if the static pressure changes because the external environment changes or the airflow resistance is increased due to internal devices of the air flow adjustment device (such as filter screen fouling).

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labelled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

The technical solutions of the embodiments of the present invention will be clearly and completely described as follows with reference to the accompanying drawings. Apparently, the embodiments as described below are merely part of, rather than all, embodiments of the present invention. Based on the embodiments of the present invention, any other embodiment obtained by a person skilled in the art without paying any creative effort shall fall within the protection scope of the present invention.

It is noted that, when a component is described to be "connected" to another component, it can be directly connected to the another component or there may be an intermediate component. Unless otherwise specified, all technical and scientific terms have the ordinary meaning as commonly understood by people skilled in the art. The terms used in this disclosure are illustrative rather than limiting.

Figure 1:
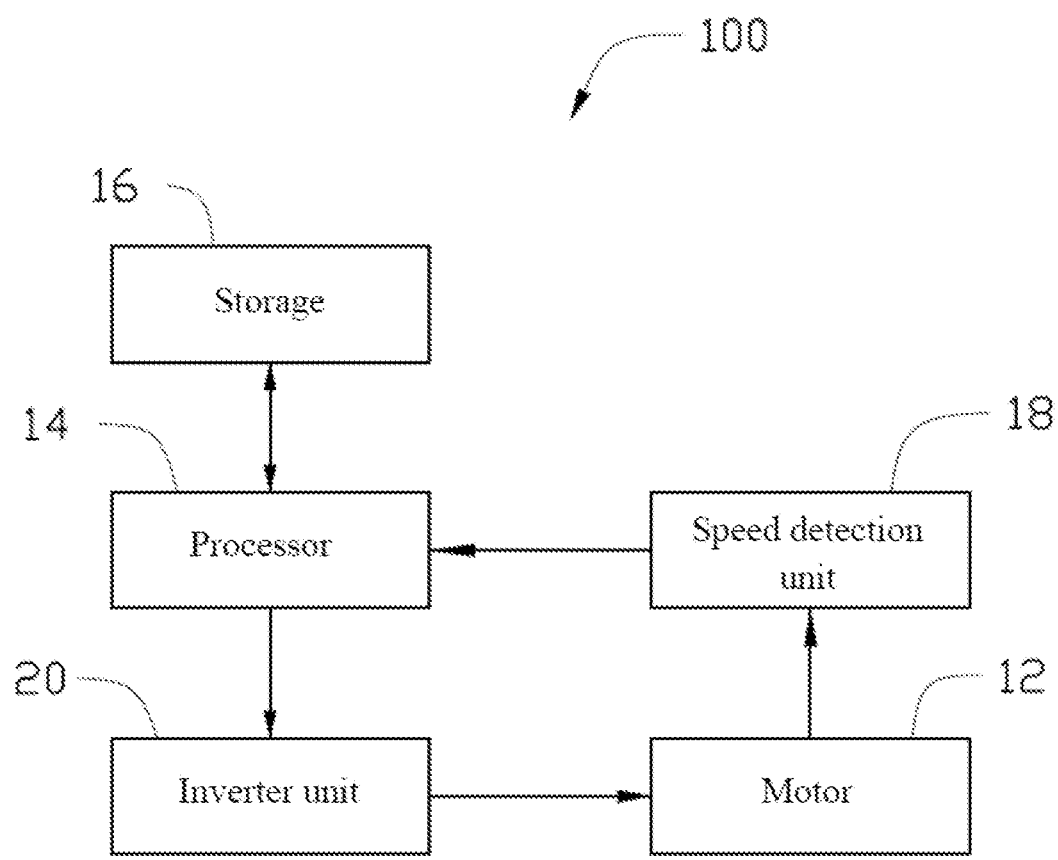
FIG. 1 shows a block diagram of a motor-driven fan device in accordance with an embodiment of the present invention.

Referring to FIG. 1, a motor-driven fan device 100 according to an embodiment of the present invention comprises a motor 12, a processor 14, a storage 16, a speed detection unit 18, and an inverter unit 20. Preferably, the motor 12 is a brushless direct current (BLDC) motor. In particular, the motor 12 is a single-phase motor. The motor 12 comprises a stator with a stator coil, and a permanent magnet rotor magnetically coupled with the stator. The processor 14 is configured to drive the motor 12 through the inverter unit 20. The speed detection unit 18 may comprise, for example, a Hall sensor. The Hall sensor may be used to detect the magnetic field of the rotor. The processor 14 can determine the actual rotating speed of the motor according to the signal output by the Hall sensor. The inverter unit 20 may comprise semiconductor switching elements, be powered by a filtered DC voltage. The connection or disconnection of the semiconductor switching elements may be controlled by a pulse width modulation (PWM) signal output by the processor 14, so that the stator coil is energized in a prescribed manner. The processor 14 is further configured to control the motor 12 to operate at a given constant rotating speed by, for example, closed-loop feedback control. The processor 14 may also control the motor 12 in an open-loop control mode when detecting the actual rotating speed of the motor is desired.

It should be understood that the motor-driven fan device 100 according to the embodiment of the present invention may be applied to electrical equipment with air flow regulating function, such as an ventilation, a blower, an air conditioner, a range hood, or the like. The motor-driven fan device 100 according to the embodiment of the present invention may still output a preset air volume Qu even when the static pressure changes due to the change of the external environment of the motor-driven fan device 100 or when the air flow resistance is increased due to the internal devices (such as filter screen fouling) of the electrical equipment.

The storage 16 stores at least one lookup table. The lookup table stores parameter values of all operating points where a plurality of fan characteristic curves driven by the motor-driven fan device 100 intersect with a plurality of system impedance curves, and parameter values of all operating points where the line on which the preset air volume Qu is located intersects with the fan characteristic curves. It should be understood that there may be a plurality of preset air volumes Qu, for example, the straight lines on which the air volume Qu of different levels are located are different, and the preset air volume Qu may be set according to the need of the user. The parameter values may comprise the static pressure P, the air volume Q, the driving voltage V and the rotating speed N of the motor. The fan characteristic curves and the system impedance curves may be depicted according to the data acquired by performing the test when the motor-driven fan device 100 is installed in the air duct testing apparatus.

Figure 2:
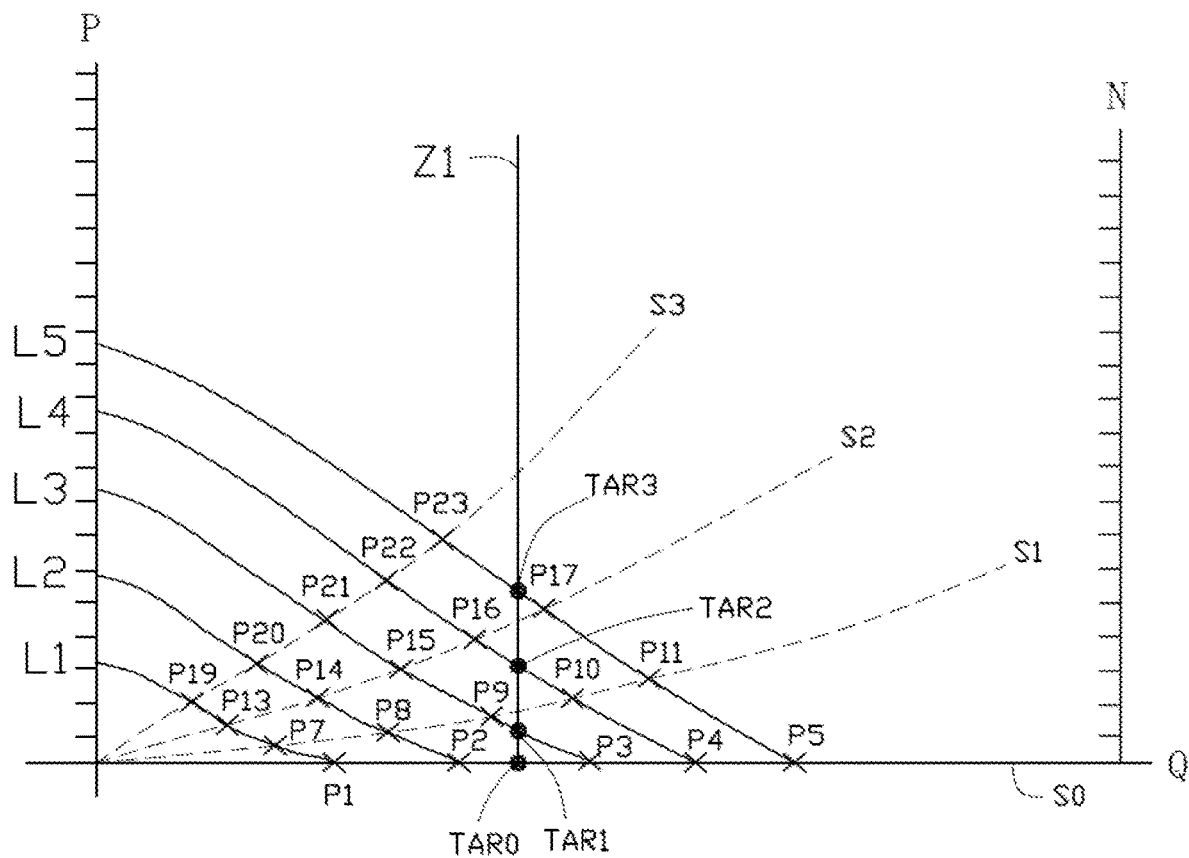
FIG. 2 shows a schematic diagram of fan characteristic curves and system impedance curves in accordance with an embodiment of the present invention.

Referring to FIG. 2, a schematic diagram of fan characteristic curves and system impedance curves according to an embodiment of the present invention are shown. In the figure, the curves L1, L2, L3, L4 and L5 respectively represent the fan characteristic curves when the motor is powered with the voltages V1, V2, V3, V4 and V5, and curves S0, S1, S2 and S3 respectively represent the system impedance curves when the motor outputs different air volumes under different static pressures of the system. The curves L1, L2, L3, L4 and L5 and the curves S0, S1, S2 and S3 respectively intersect at a plurality of operating points P1-P5, P7-P11, P13-P17 and P19-P23. In the present embodiment, the operating points P1 to P5 have corresponding parameter values of the static pressure P (P=0), the air volume Q, the driving voltage V and the rotating speed N of the motor. The other operating points P7-P11, P13-P17, and P19-P23 have corresponding parameter values of the air volume Q, the driving voltage V and the rotating speed N of the motor. For example, the parameter values corresponding to the operating point P1 are denoted as (P1, Q1, V1, N1), and the parameter values corresponding to the operating point P2 are denoted as (P2, Q2, V2, N2), and so on. It should be noted that all the operating points P1, P7, P13 and P19 on the same fan characteristic curve, such as L1, have the same driving voltage value, that is, V1=V7=V13=V19.

Those skilled in the art will appreciate that the curves shown in FIG. 2 are fitted based on each operating point predefined in the fan. The lookup table stored in the storage 16 may record the curves in FIG. 2 by storing a table representing each of the discrete operating points.

After the electrical equipment using the motor-driven fan device 100 is installed by the user, the electrical equipment is typically required to be able to provide the preset air volume Qu. In this embodiment, the preset air volume Qu is represented by a straight line Z1 in the coordinate system shown in FIG. 2, and intersections of the straight line Z1 and the fan characteristic curves are a plurality of operating points. Depending on the value of the preset air volume Qu, the straight line Z1 may intersect with all of the fan characteristic curves, or may intersect with part of the fan characteristic curves. In the present embodiment, the straight line Z1 intersects the fan characteristic curves L3, L4 and L5, respectively, and the operating points formed by the intersections are denoted as TAR1, TAR2 and TAR3, respectively. The straight line Z1 also intersects the straight line S0 where the static pressure equals zero, and the operating point formed by this intersection is denoted as TAR0. Each of the operating points TAR0, TAR1, TAR2 and TAR3 also has corresponding parameter values of the air volume Q, the driving voltage V and the rotating speed N of the motor. Those skilled in the art may understand that the static pressure P at the operating point TAR0 is equal to zero, and the parameter values corresponding to the other operating points TAR1, TAR2 and TAR3 may not comprise the static pressure value. The parameter values corresponding to the operating point TAR0 are denoted as (TP0, TQ0, TV0, TN0), the parameter values corresponding to the operating point TAR1 are denoted as (TQ1, TV1, TN1), and the parameter values of other operating points TAR2 and TAR3 may be acquired in the same manner. The parameter values of each of the operating points TAR0, TAR1, TAR2 and TAR3 may be acquired experimentally, or acquired by calculation according to the existing operating points P1-P5, P7-P11, P13-P17 and P19-P23. For example, the parameter values corresponding to the operating point TAR0 may be acquired in the following manner:

Two operating points where the air volume is the closest to the preset air volume Qu are searched from the operating points P1, P2, P3, P4 and P5 where the static pressures P are equal to zero. In this embodiment, the two operating points are the known operating point P2 containing the array (Q3, V3, N3) and the known operating point P3 containing the array (Q2, V2, N2). The driving voltage TV0 of the motor when the static pressure P is equal to zero and the preset air volume is Qu can thus be acquired according to the two-point equation $(Q2-Qu)/(V2-TV0)=(Qu-Q3)/(TV0-V3)$ and the preset air volume Qu at the known operating point TAR0. Similarly, the rotating speed TN0 of the motor when the static pressure P is equal to zero and the preset air volume is Qu can be acquired, according to the two-point equation $(Q2-Qu)/(N2-TN0)=(Qu-Q3)/(TN0-N3)$.

Similarly, the parameter values of the operating points TAR1, TAR2, and TAR3, where the line Z1 on which the preset air volume Qu is located intersects with the fan characteristic curves L3, L4, and L5, can be acquired in the following manner, and the operating point TAR1 where the straight line Z1 intersects with the fan characteristic curve L3 will now be described as an example.

Two operating points, where the air volume is the closest to the preset air volume Qu are searched from the fan characteristic curve L3. In this embodiment, the two operating points are the operating points P3 and P9. As the voltage parameters corresponding to the operating points P3 and P9 are known and are the same as the driving voltages TV1 at the operating point TAR1, the driving voltage TV1 at the operating point TAR1, where the line Z1 on which the preset air volume Qu is located intersects with the fan characteristic curve L3, may be acquired. According to the two-point equation $(Q3-TQ1)/(N3-TN1)=(TN1-Q9)/(TN1-N9)$, as TQ1 is known and equal to Qu, the rotating speed TN1 at the operating point TAR1, where the line Z1 on which the preset air volume Qu is located intersects with the fan characteristic curve L3, may be acquired. The parameter values of other operating points TAR2 and TAR3 may be acquired in the same way. It should be understood that, after the user sets a preset air volume Qu during use, the motor-driven fan device 100 stores the calculated parameter values of each of the operating points TAR0, TAR1, TAR2 and TAR3 in the storage 16.

Figure 4:
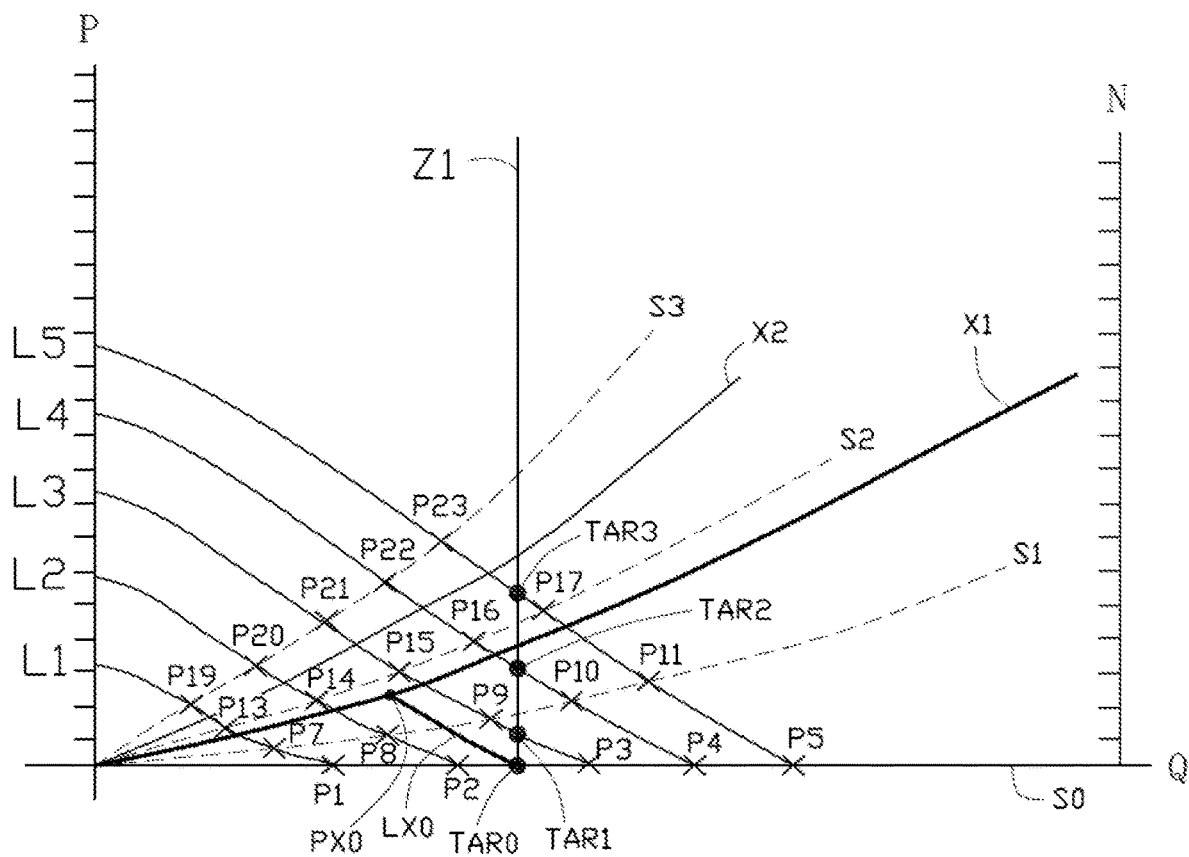
FIG. 4 to FIG. 6 are schematic diagrams of a process for acquiring a target driving voltage corresponding to a preset air volume by using the air volume control method in accordance with the embodiment of the present invention.

When the user initially installs the air flow adjustment device, or during use of the air flow adjustment device, the system static pressure may change due to the variation of installation environment such as external wind pressure, pipe conditions, etc. and, as a result, the system impedance curve may coincide with or be offset from the system impedance curve stored in the lookup table. For example, the actual system impedance curve is shifted to the curve X1 after fan installation (as shown in FIG. 4). Therefore, the motor needs to be adjusted so that the new unknown system impedance curve produced after the system is installed for the first time can still be used to find the target rotating speed to output the preset air volume Qu by an iterative calculation method.

The processor 14 acquires the driving voltage TV and corresponding rotating speed TN of the motor associated with the preset air volume Qu when the static pressure P is equal to zero by querying the lookup table or calculation based on the stored data in the lookup table according to the preset air volume Qu, and takes the acquired driving voltage and the rotating speed as the target driving voltage TV and the corresponding target rotating speed TN. The processor drives the motor with the target driving voltage TV. The processor determines whether the absolute value of the rotating speed difference $\Delta N=|N-TN|$ between the actual rotating speed N and the target rotating speed TN of the motor, acquired by the speed detection unit, is within a range of a preset rotating speed difference. When the absolute value of the rotating speed difference $\Delta N$ is within the range of the preset rotating speed difference, the processor 14 maintains the operation of the motor 12 at the target rotating speed TN at that point by using a closed-loop speed control method (such as PID, PI or PD closed-loop feedback control method) to drive the fan apparatus. When the absolute value of the rotating speed difference ΔN is not within the range of the preset rotating speed difference, the processor repeatedly adds a gain value Vz to the target driving voltage to acquire a new target driving voltage TV=TV+Vz, drives the motor to operate with the new target driving voltage TV and acquires the actual rotating speed N, acquires the target rotating speed TN corresponding to the new target driving voltage TV by querying the lookup table or calculating based on the stored data in the lookup table, and determines whether the absolute value of the rotating speed difference is within the range of the preset rotating speed difference. The processor keeps adding the gain value Vz to the target driving voltage until the absolute value of rotating speed difference ΔN becomes within the range of the preset rotating speed difference. When the absolute value of the rotating speed difference ΔN is within the range of the preset rotating speed difference, the processor 14 maintains the operation of the motor at the target rotating speed TN at that point by using the closed-loop speed control method (such as PID, PI or PD closed-loop feedback control method), that is, the rotating speed TN of the motor for outputting the preset air volume Qu is ensured.

Figure 3:
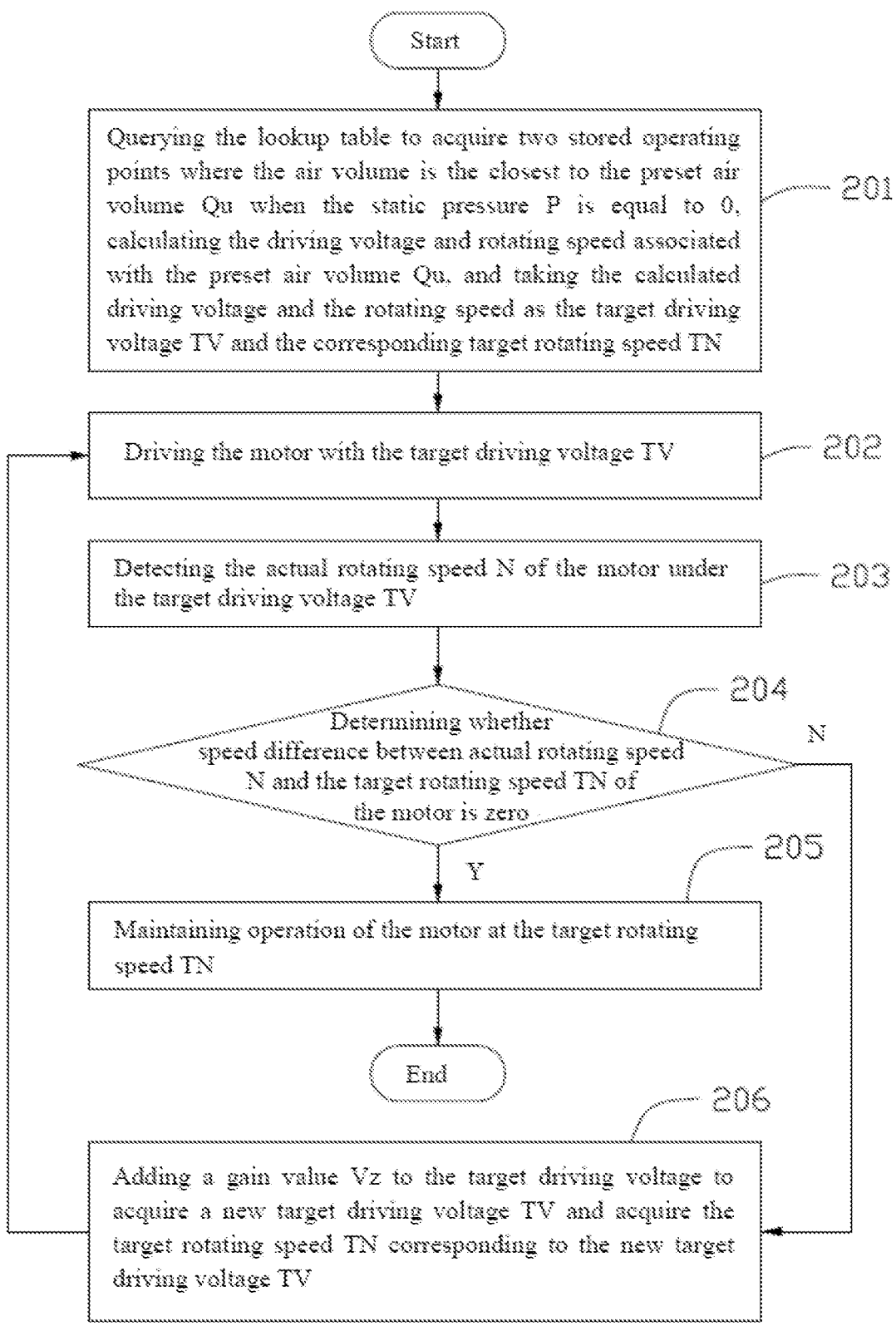
FIG. 3 shows a flowchart of an air volume control method in accordance with an embodiment of the present invention.

Referring to FIG. 3, a method for controlling the air volume of an air flow adjustment device which is driven by a motor is illustrated according to another embodiment. The method may adjust the motor so that the device can still output the preset air volume Qu even when the static pressure changes, and the device is driven by the motor-driven fan device. The method includes the following steps:

201: A driving voltage TV and a corresponding rotating speed TN of the motor associated with the preset air volume Qu when the static pressure P is equal to zero are acquired by querying the lookup table or calculating based on the stored data in the lookup table according to the preset air volume Qu equal to zero, and the acquired driving voltage and the rotating speed are taken as the target driving voltage TV and the corresponding target rotating speed TN.

As can be seen from FIG. 4, the operating point TAR0 is the operating point where the provided air volume is equal to the preset air volume Qu when the static pressure P is equal to zero. After the operating point TAR0 is acquired, the driving voltage TV0 and the corresponding rotating speed TN0 at the operating point TAR0 are then acquired, and then the driving voltage TV0 is set as the target driving voltage TV, and the rotating speed TN0 is set as the target rotating speed TN. The method for acquiring the operating point TAR0 has already been introduced above, explanation of which is not repeated herein.

202: The motor is driven with the target driving voltage TV.

203: The actual rotating speed N of the motor under the target driving voltage TV is detected.

The actual rotating speed N is acquired by calculating a Hall signal detected by a Hall sensor. It can be seen from FIG. 4 that the rotating speed at the intersection point PX0, where the fan characteristic curve LX0 on which the target driving voltage TV=TV0 is located intersects with the actual system impedance curve X1, is the actual rotating speed N.

204: It is determined whether the absolute value of the rotating speed difference ΔN=|N−TN| between the actual rotating speed N and the target rotating speed TN of the motor is zero. When the absolute value of the rotating speed difference ΔN is zero, step 205 is performed. When the absolute value of the rotating speed difference is not zero, step 206 is performed. Of course, in other embodiments, it may also be determined whether the absolute value of the rotating speed difference ΔN is within a range of a preset rotating speed difference.

As can be seen from FIG. 4, the absolute value of the rotating speed difference ΔN is relatively large, which is not zero.

205: Operation of the motor is maintained at the target rotating speed TN at that point.

Those skilled in the art may understand that a constant speed control method, such as PID, PI or PD closed-loop feedback control method, may be used to maintain the operation of the motor at the target rotating speed TN.

206: A gain value Vz is added to the target driving voltage to acquire a new target driving voltage TV=TV+Vz; a target rotating speed TN corresponding to the new target driving voltage TV is acquired by querying the lookup table or calculating based on the stored data in the lookup table; and the method returns to step 202.

Figure 5:
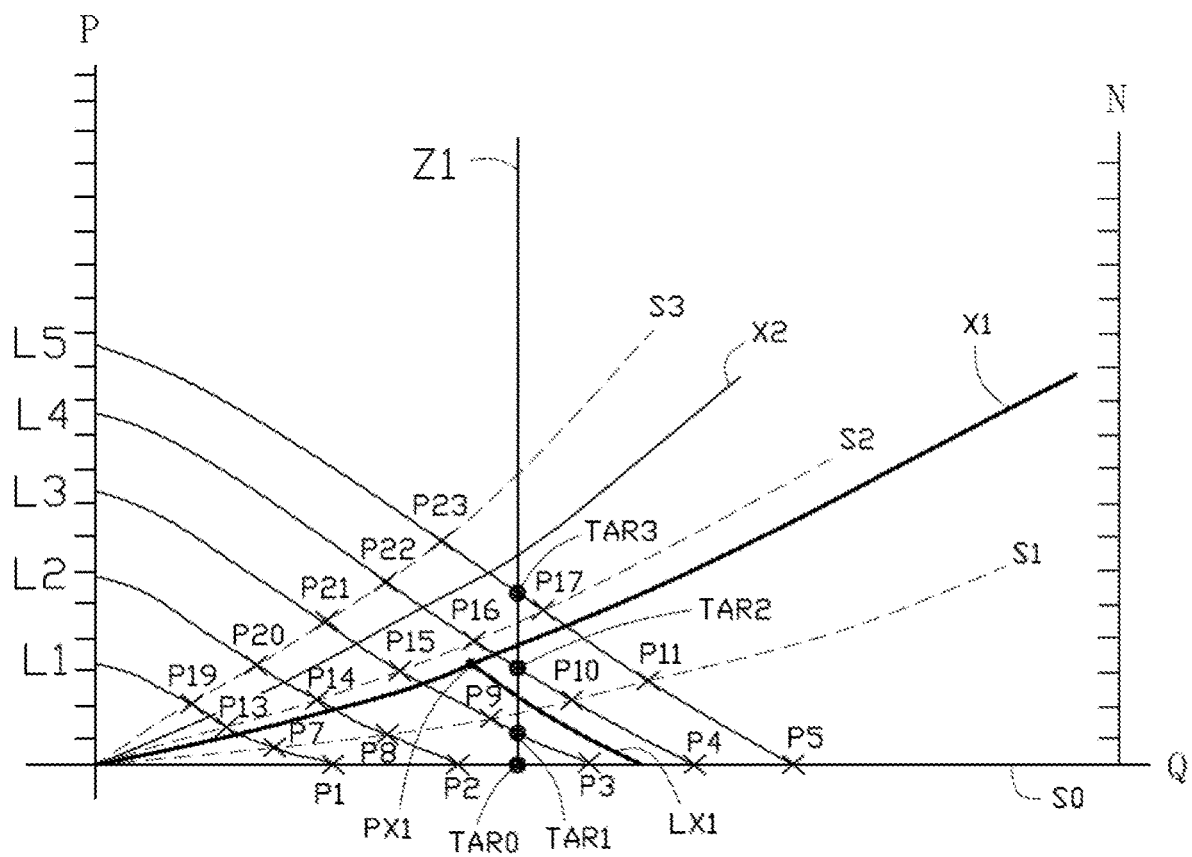
Figure 6:
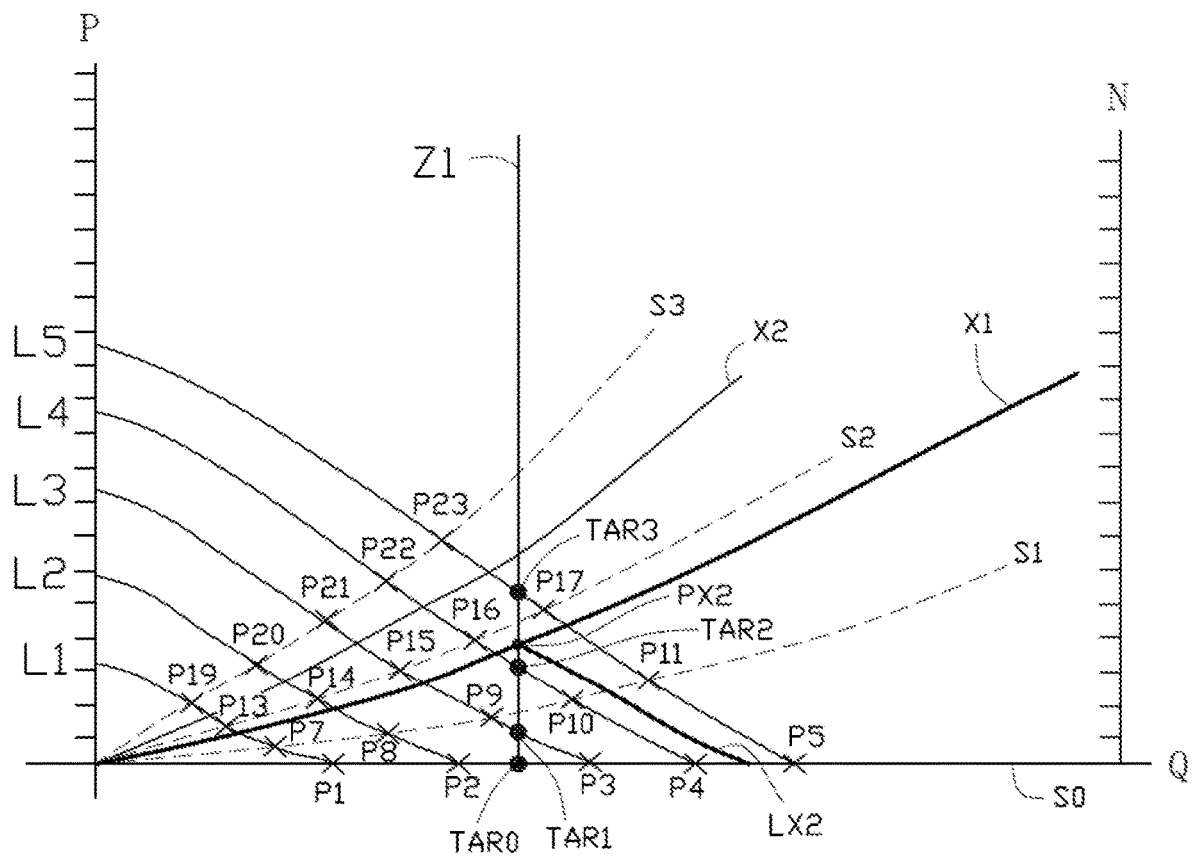

Referring to FIG. 5, after the gain value Vz is added, a fan characteristic curve, on which the new target driving voltage TV=TV+Vz is located, is illustrated as an example, which is changed to LX1. Two stored operating points on the line Z1, where the driving voltages are the closest to the new target driving voltage TV, are searched from the operating points where the line Z1 on which the preset air volume Qu is located intersects with the fan characteristic curves. For example, the two operating points are TAR1 (TQ1, TV1, TN1) and TAR2 (TQ2, TV2, TN2) as shown in FIG. 5. The target rotating speed TN is acquired according to the two-point equation (TV1−TV)/(TV−TV2)=(TN1−TN)/(TN−TN2) and the known TV. The rotating speed at the intersection point PX1, where the fan characteristic curve LX1 intersects with the system impedance curve X1, is the actual rotating speed N. The actual rotating speed N of the motor can be acquired by calculating the signal sensed by the Hall sensor, and the processor continues to determine whether the absolute value of the rotating speed difference ΔN=|N−TN| between the actual rotating speed N and the target rotating speed TN of the motor, acquired by the sensor, is zero. When the absolute value of the rotating speed difference between the actual rotating speed N and the target rotating speed TN of the motor is not zero, the gain value Vz is continually added to the target driving voltage, until that as shown in FIG. 6. Referring to the intersection point PX2 where the fan characteristic curve LX2 intersects with the system impedance curve X1 in FIG. 6, the actual rotating speed N of the motor at the intersection point PX2 is the same as the target rotating speed TN, and the addition of the gain value Vz is stopped, in which case it is determined that the motor is driven at the target rotating speed TN which is equal to the actual rotating speed N. The processor 14 may be configured to control the motor 12 to operate at the given target rotating speed by, for example, closed-loop feedback control.

Figure 7:
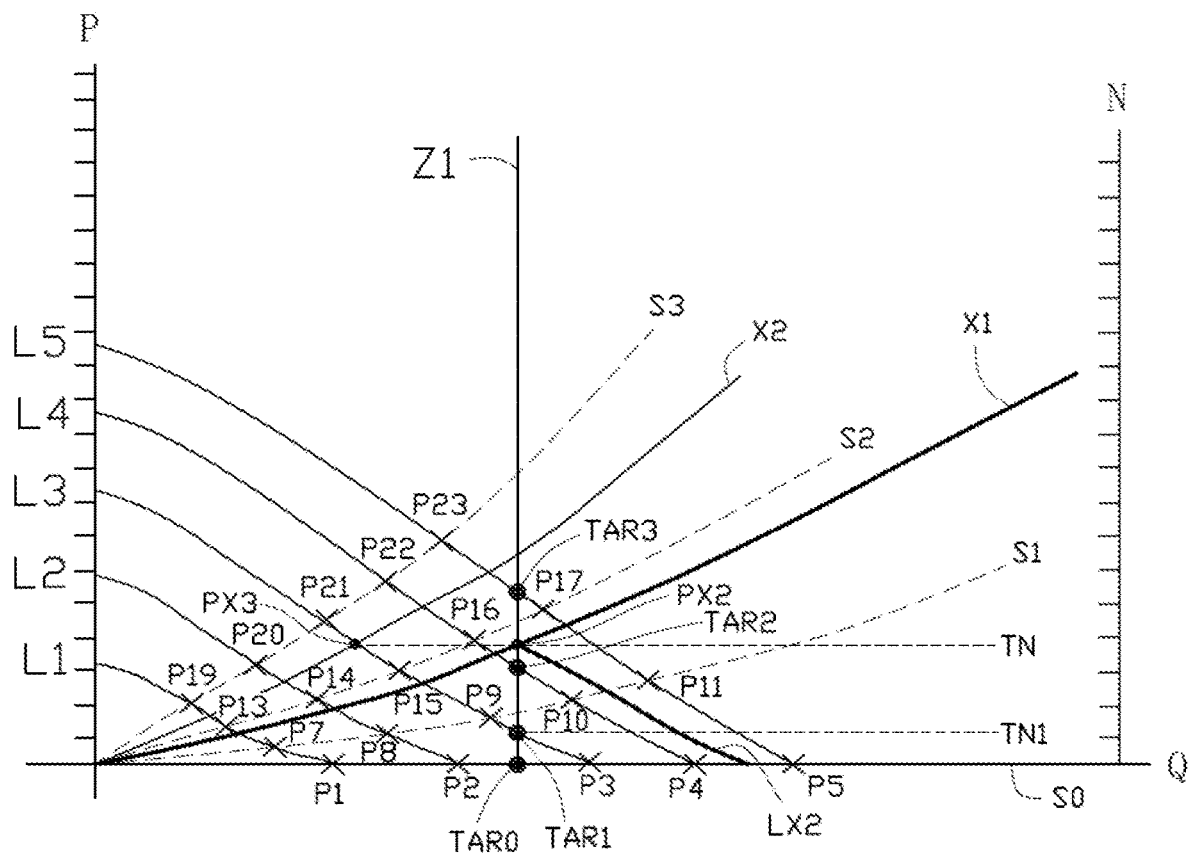
FIG. 7 and FIG. 8 show system impedance curves when the adjustment cycle expires, with the operating point shifted.
Figure 8:
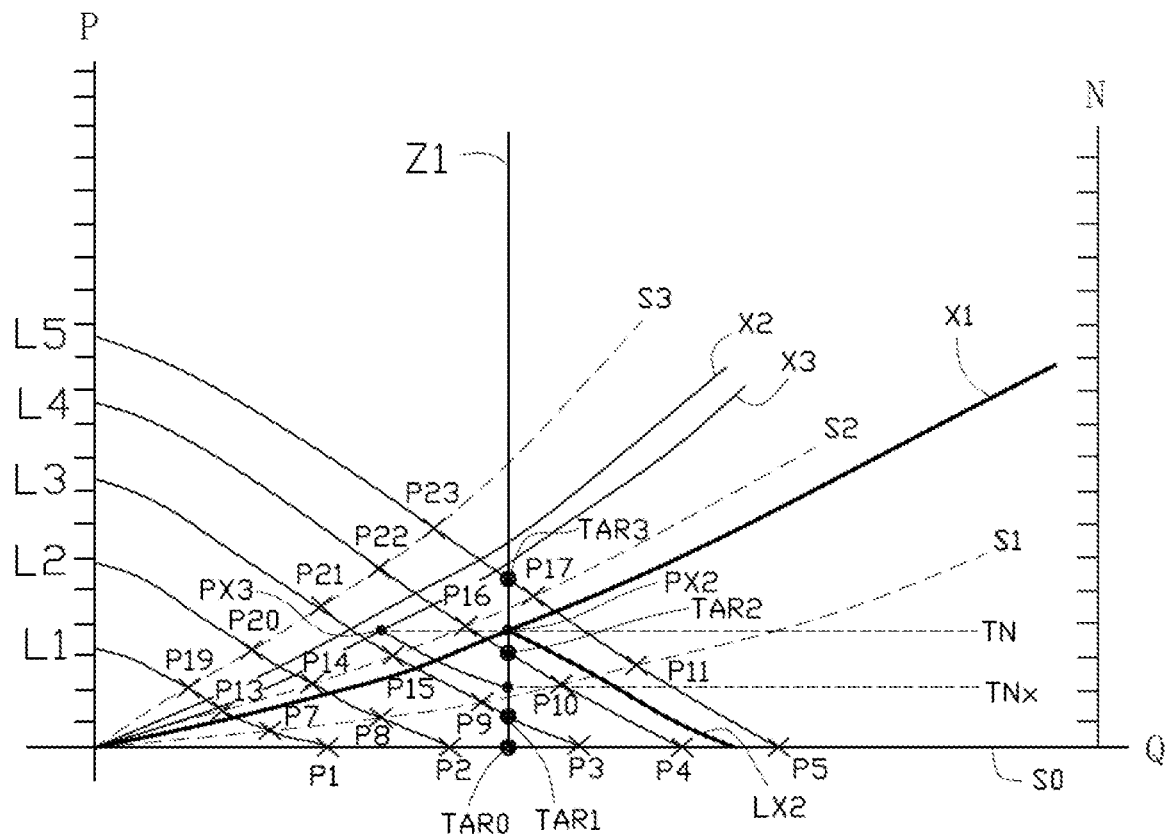

Dust or oil stain may accumulate in the air duct during the operation of the equipment, so that the static pressure of the system is increased, and the system impedance curve may shift, for example, from X1 to X2 (as shown in FIG. 7). Therefore, the motor needs to be adjusted again so that the system can still output the preset air volume Qu even when the static pressure changes. That is, the above steps 201-206 are required to be performed again. A preset adjustment period, such as three months or six months, is usually set to determine whether the motor needs to be adjusted. When the adjustment period expires, the processor 14 determines whether the system impedance curve has shifted. The processor 14 detects the actual driving voltage and actual speed of the motor at that point. As the rotating speed TN that provides the preset air volume Qu has been determined at the initial installation of the equipment, and the motor is maintained to operate at the target rotating speed TN by using the constant speed control method, the current actual motor speed N is thus TN. However, because the system impedance curve is shifted from X1 to X2, the actual operating point when the motor is driven at the rotating speed TN may be shifted from PX2 to PX3. As can be seen from FIG. 7, although the operating points PX2 and PX3 have the same rotating speed, the air volume provided by the operating point PX3 is less than the preset air volume Qu. The processor 14 detects the current actual driving voltage TVx of the motor (which can be acquired according to the duty cycle of the PWM signal), and acquires the corresponding rotating speed TNx according to the operating point where the fan characteristic curve on which the actual driving voltage TVx is located intersects with the line Z1 on which the preset air volume Qu is located. Those skilled in the art may understand that the fan characteristic curve on which the actual driving voltage TVx is located may coincide with the fan characteristic curve already stored in the lookup table, such as, with the fan characteristic curve L3 as shown in FIG. 7. By querying the lookup table, the operating point TAR1, where the fan characteristic curve L3 intersects with the line Z1 on which the preset air volume Qu is located, may be acquired, and the corresponding rotating speed TNx=TN1 may also be acquired. As shown in FIG. 8, after the adjustment period expires, the system impedance curve is shifted from X1 to X3, and when the fan characteristic curve on which the actual driving voltage TVx is located does not coincide with the fan characteristic curve already stored in the lookup table, the method for acquiring the corresponding rotating speed TNx according to the actual driving voltage TVx is similar to the method for acquiring the target rotating speed by using the new target driving voltage at step 206. That is, the two operating points, where the driving voltages are the closest to the actual target driving voltage TVx, are searched from the stored operating points where the line Z1 on which the preset air volume Qu is located intersects with the fan characteristic curve, according to the actual driving voltage TVx. In the embodiment as shown in FIG. 8, the two operating points are TAR1 (TQ1, TV1, TN1) and TAR2 (TQ2, TV2, TN2), respectively. The corresponding rotating speed TNx is acquired according to the two-point equation $(TV1-TVx)/(TVx-TV2)=(TN1-TNx)/(TNx-TN2)$. The processor 14 determines whether the absolute value of the rotating speed difference $\Delta N1=|N-TNx|$ between the actual rotating speed N and the corresponding rotating speed TNx of the motor is zero or within the range of the preset rotating speed difference. When the absolute value of rotating speed difference $\Delta N1$ is not zero or not within the predetermined rotating speed difference range, the processor 14 is informed that the actual system impedance curve has shifted, and steps 201-206 are performed again to re-determine the rotating speed required for maintaining the preset air volume Qu.

Those skilled in the art may understand that the gain value Vz may be a fixed value in at least one embodiment, such as a fine tuning value which is greater than zero. The iterative method described in this application uses a method for gradually approaching the target rotating speed TN. That is, the processor 14 repeatedly executes the step of increasing the driving voltage by the gain value Vz (that is, gradually increasing the duty cycle of the PWM signal) from the driving voltage TV0 of the operating point Tar0 where the static pressure P=0. Because the gain value Vz is a fine tuning value, during the adjustment, the actual rotating speed N gradually approaches and finally becomes equal to the target rotating speed TN. Therefore, the actual rotating speed N will not exceed the target rotating speed TN by gradually and slightly increasing the driving voltage, which will not incur vibration problems. In other embodiments, the gain value Vz may be a group of various values, comprising such as positive numbers and/or negative numbers. The processor 14 may choose one of them to execute the iterative method according the rotating speed difference between the actual rotating speed N and the target rotating speed TN of the motor.

Those skilled in the art may also understand that in other embodiments of the present invention, if the operating points TAR0, TAR1, TAR2 and TARS, where the line Z1 on which the preset air volume Qu is located intersects with the fan characteristic curves, are not stored in the lookup table correspondingly, the steps of determining the operating points TAR0, TAR1, TAR2 and TAR3 may be executed before the step 201. The method for acquiring the operating points TAR0, TAR1, TAR2 and TAR3 has been introduced above, explanation of which is not repeated herein.

According to the embodiments of the present invention, even if the external environment changes or the airflow resistance is increased due to internal devices of the air flow adjustment device (such as filter screen fouling) so that the static pressure changes, the air flow adjustment device is enabled to still output constant air volume. In the embodiments of the present invention, the rotating speed of the motor is determined by sensing the rotor position signal which is detected by the Hall sensor. The processor controls the driving voltage of the motor by controlling the duty cycle of the PWM signal provided to the motor without the need of detecting the current and without the need of providing a current sensor in the system, which decreases the system cost and avoids serious signal noise in the current of the motor, otherwise the received data would cause erroneous control to result in poor reliability in providing the constant air flow. The processor is capable of automatically performing numerical calculation and/or information processing according to operating points and arrays previously set or stored, and its hardware comprises but is not limited to a microprocessor, an application specific integrated circuit (ASIC), a field-programmable gate array (FPGA), a digital signal processor (DSP), a PAL, a GAL, PLD and the like.

The above embodiments are merely to illustrate the technical solutions of the present invention and are not intended to limit the present invention. Although the present invention has been described with reference to the above embodiments, it should be appreciated by those skilled in the art that various modifications and variations may be made without departing from the spirit and scope of the present invention.

The invention claimed is:

1. A method for controlling an air volume of an air flow adjustment device driven by a motor, the method comprising:
   a: acquiring a driving voltage and a rotating speed of the motor when a static pressure P is equal to zero by querying a lookup table according to a preset air volume Qu, the acquired driving voltage and rotating speed being taken as a target driving voltage TV and a corresponding target rotating speed TN; wherein the lookup table stores parameter values of all operating points where a plurality of fan characteristic curves intersect with a plurality of system impedance curves;

b: driving the motor with the target driving voltage TV;

c: detecting an actual rotating speed N of the motor under the target driving voltage TV;

d: determining whether an absolute value of a rotating speed difference $\Delta N=|N-TN|$ between the actual rotating speed N and the target rotating speed TN of the motor is within the range of a preset rotating speed difference;

e: maintaining operation of the motor at the target rotating speed TN when the absolute value of the rotating speed difference $\Delta N$ is within the preset rotating speed difference;

f: adding a gain value Vz to the target driving voltage to acquire a new target driving voltage TV=TV+Vz when the absolute value of rotating speed difference $\Delta N$ is not within the range of the preset rotating speed difference; and acquiring the target rotating speed TN corresponding to the new target driving voltage TV by querying the lookup table or calculating based on the stored data in the lookup table; and returning to execute step b.

2. The method of claim 1, wherein the parameter values at least comprise the air volume, the driving voltage and the rotating speed of the motor.

3. The method of claim 2, wherein acquiring a driving voltage and a rotating speed of the motor when the static pressure P is equal to zero comprises acquiring two stored operating points which have air volume values closest to the preset air volume Qu when the static pressure P is equal to zero, calculating a driving voltage and a rotating speed at an operating point Tar0 of the motor associated with the preset air volume Qu based on known driving voltages and known rotating speeds of the motor contained in the two operating points.

4. The method of claim 1, wherein parameter values of all operating points where the line on which the preset air volume Qu is located intersects with the fan characteristic curves, the parameter values at least comprise the air volume, the driving voltage and the rotating speed of the motor.

5. The method of claim 4, wherein when the static pressure P is equal to zero, the driving voltage and the rotating speed at the operating point of the motor associated with the preset air volume Qu are acquired through the steps of:

searching for two operating points Pa and Pb, where the air volume is the closest to the preset air volume Qu, from the stored operating points where the static pressure is equal to zero, wherein the known air volume, the known driving voltage and the known rotating speed of the motor corresponding to the operating point Pa are denoted as Qa, Va, Na, and the known air volume, the known driving voltage and the known rotating speed of the motor corresponding to the operating point Pb are denoted as Qb, Vb, Nb;

acquiring a driving voltage TV of the motor when the static pressure P is equal to zero and the preset air volume is Qu according to a two-point equation (Qa−Qu)/(Va−TV)=(Qu−Qb)/(TV−Vb); and acquiring a target rotating speed TN of the motor when the static pressure P is equal to zero and the preset air volume is Qu according to a two-point equation (Qa−Qu)/(Na−TN)=(Qu−Qb)/(TN−Nb).

6. The method of claim 4, wherein the parameter values of the rotating speeds at the operating points, where the line on which the preset air volume Qu is located intersects with each of the fan characteristic curves, are acquired through the steps of:

searching for two operating points Pc and Pd where the air volume is the closest to the preset air volume Qu from the stored operating points on each of the fan characteristic curves i; wherein the air volume, the driving voltage and the rotating speed of the motor corresponding to the operating point Pc are denoted as Qc, Vc, Nc; wherein the air volume, the driving voltage and the rotating speed of the motor corresponding to the operating point Pd are denoted as Qd, Vd, and Nd; and acquiring the rotating speed TNi of the operating point, where the line on which the preset air volume Qu is located intersects with the fan characteristic curve i, according to the two-point equation (Qc−TQi)/(Nc−TNi)=(TQi−Qd)/(TNi−Nd) and TQi=Qu.

7. The method of claim 6, wherein the step (f) further comprises:

searching for two operating points TARa and TARb, where the driving voltages are the closest to a new target driving voltage TV, from the stored operating points where the line on which the preset air volume Qu is located intersects with the fan characteristic curve, according to the new target driving voltage TV, wherein the known air volume, the known driving voltage and the known rotating speed of the motor corresponding to the operating point TARa are denoted as TQa, TVa and TNa, and wherein the known air volume, the known driving voltage and the known rotating speed of the motor corresponding to the operating point TARb are denoted as TQb, TVb and TNb; and acquiring the target rotating speed TN according to the two-point equation (TVa−TV)/(TV−TVb)=(TNa−TN)/(TN−TNb).

8. The method of claim 4, wherein the air volume control method further comprises periodic automatic adjustment steps of:

detecting an actual current driving voltage TVx and an actual current rotating speed N of the motor when the adjustment cycle of the air volume is expired;

determining a corresponding rotating speed TNx at an operating point, where the fan characteristic curve on which the actual driving voltage is located intersects with the line on which the preset air volume Qu is located, by using the known driving voltage and the known rotating speed data of the motor in the lookup table, according to the actual driving voltage TVx;

determining whether an absolute value of a rotating speed difference between the actual rotating speed N and the corresponding rotating speed TNx of the motor is within a range of a preset rotating speed difference; maintaining operation of the motor with the actual rotating speed N by using the constant speed control method when the absolute value of the rotating speed difference is within the preset rotating speed difference; and returning to execute steps a-f when the absolute value of rotating speed difference is not within the range of the preset rotating speed difference.

9. The method of claim 8, wherein the corresponding rotating speed TNx at the operating point, where the fan characteristic curve on which the actual driving voltage TVx is located intersects with the line Z1 on which the preset air volume Qu is located, is acquired by querying the lookup table when the fan characteristic curve on which the actual driving voltage TVx is located coincides with a fan characteristic curve already stored in the lookup table; and two operating points TARc and TARd, where the driving voltages are the closest to the actual driving voltage TVx, are searched from the stored operating points where the line on which the preset air volume Qu is located intersects with the fan characteristic curve, according to the actual driving voltage TVx, when the fan characteristic curve on which the actual driving voltage TVx is located does not coincide with the fan characteristic curve already stored in the lookup table, and the known air volume, the known driving voltage and the known rotating speed of the motor corresponding to the operating point TARc are denoted as TQc, TVc and TNc, and wherein the known air volume, the known driving voltage and the known rotating speed of the motor corresponding to the operating point TARd are denoted as TQd, TVd and TNd; the corresponding rotating speed TNx are acquired according to the two-point equation $(TVc-TVx)/(TVx-TVd)=(TNc-TNx)/(TNx-TNd)$.

10. The method of claim 1, wherein the gain value Vz is a fine-tuning value greater than zero.

11. The method of claim 1, wherein the gain value Vz is a group of various values which comprises positive numbers and/or negative numbers, when the absolute value of rotating speed difference is not within the range of the preset rotating speed difference, choose one of the values to acquire a new target driving voltage according the rotating speed difference between the actual rotating speed N and the target rotating speed TN of the motor.

12. The method of claim 1, wherein the target driving voltage of the motor is controlled by controlling a duty cycle of a PWM signal provided to the motor.

13. The method of claim 1, wherein the actual rotating speed N is acquired by calculating a Hall signal detected by a Hall sensor of the motor.

14. A motor-driven fan device comprising:
a motor;
a processor for driving the motor;
a storage for storing a lookup table, wherein the lookup table stores parameter values of all operating points where a plurality of fan characteristic curves intersect with a plurality of system impedance curves;
a sensor for detecting a rotating speed of the motor,
wherein the processor is configured to query the lookup table or calculate based on the stored data in the lookup table according to the preset air volume Qu to acquire the target driving voltage TV and a corresponding target rotating speed TN of the motor associated with the preset air volume Qu when a static pressure P is equal to zero, the processor is configured to drive the motor with the target driving voltage TV, the processor is configured to determine whether an absolute value of a rotating speed difference $\Delta N=|N-TN|$ between the actual rotating speed N and the target rotating speed TN of the motor, acquired by the sensor, is within a range of a preset rotating speed difference, the processor is configured to maintain the operation of the motor at the target rotating speed TN at that point when the rotating speed difference $\Delta N$ is within the range of the preset rotating speed difference, and the processor is configured to repeatedly add a gain value Vz to the target driving voltage to acquire a new target driving voltage $TV=TV+Vz$ when the absolute value of rotating speed difference $\Delta N$ is not within the range of the preset rotating speed difference, and then drive the motor to operate with a new target driving voltage TV and acquire the actual rotating speed N, acquire the target rotating speed TN corresponding to the new target driving voltage TV, and determine whether the absolute value of the rotating speed difference is within the range of the preset rotating speed difference, and the processor is configured to maintain the operation of the motor at the target rotating speed TN at that point by using the constant speed control method when the absolute value of rotating speed difference $\Delta N$ is within the range of the preset rotating speed difference.

15. The motor-driven fan device of claim 14, wherein parameters of all operating points where the line on which the preset air volume Qu is located intersects with the fan characteristic curves, the parameter values at least comprise the air volume, a driving voltage and a rotating speed of the motor.

16. The motor-driven fan device of claim 14, wherein the constant speed control method is one of a PID, PI and PD closed-loop feedback control method.

17. The motor-driven fan device of claim 14, wherein the gain value Vz is a fine-tuning value greater than zero.

18. The motor-driven fan device of claim 14, wherein the gain value Vz is a group of various values which comprises positive numbers and/or negative numbers, when the absolute value of rotating speed difference is not within the range of the preset rotating speed difference, the processor drives the motor to operate with one of the values to acquire a new target driving voltage according the rotating speed difference between the actual rotating speed N and the target rotating speed TN of the motor.

19. The motor-driven fan device of claim 14, wherein the motor is a single phase brushless direct current motor.

20. An air flow adjustment device comprising the motor-driven fan device in accordance with claim 14.

* * * * *